US010268394B2

(12) United States Patent
Liu et al.

(10) Patent No.: US 10,268,394 B2
(45) Date of Patent: Apr. 23, 2019

(54) DATA STORAGE DEVICE PERFORMANCE OPTIMIZATION METHOD AND APPARATUS

(71) Applicant: Seagate Technology LLC, Cupertino, CA (US)

(72) Inventors: Xiong Liu, Singapore (SG); Feng Shen, Singapore (SG); WenXiang Xie, Singapore (SG); WeiQing Zhou, Singapore (SG)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 3 days.

(21) Appl. No.: 15/233,703

(22) Filed: Aug. 10, 2016

(65) Prior Publication Data

US 2018/0046382 A1 Feb. 15, 2018

(51) Int. Cl.
*G06F 3/06* (2006.01)
*G11B 20/12* (2006.01)
*G06F 12/0866* (2016.01)

(52) U.S. Cl.
CPC .......... *G06F 3/0611* (2013.01); *G06F 3/0646* (2013.01); *G06F 3/0653* (2013.01); *G06F 3/0676* (2013.01); *G06F 12/0866* (2013.01); *G11B 20/1217* (2013.01); *G06F 2212/1024* (2013.01); *G06F 2212/21* (2013.01); *G11B 2020/1238* (2013.01); *G11B 2020/1242* (2013.01); *G11B 2020/1292* (2013.01)

(58) Field of Classification Search
CPC .......... G06F 3/06; G06F 12/02; G06F 3/0611; G06F 12/0238; G06F 3/0646; G06F 3/0653; G06F 3/0676; G06F 2212/1024; G06F 2212/21; G06F 2212/70; G11B 20/12; G11B 2020/1292; G11B 2020/1238; G11B 2020/1242; G11B 20/1217

See application file for complete search history.

(56) References Cited

U.S. PATENT DOCUMENTS

| 5,719,983 | A | * | 2/1998 | Henderson | ............ | G06F 3/0601 |
| | | | | | | 348/E7.073 |
| 6,128,717 | A | | 10/2000 | Harrison et al. | | |
| 7,096,336 | B2 | | 8/2006 | Furuhashi et al. | | |
| 7,124,272 | B1 | | 10/2006 | Kennedy et al. | | |
| 9,002,795 | B2 | | 4/2015 | Messinger et al. | | |
| 9,129,628 | B1 | | 9/2015 | Fallone et al. | | |
| 9,317,216 | B1 | | 4/2016 | O'Brien et al. | | |
| 9,324,366 | B1 | | 4/2016 | Wiesen et al. | | |
| 9,330,009 | B1 | | 5/2016 | Throop et al. | | |

(Continued)

*Primary Examiner* — David Yi
*Assistant Examiner* — Zubair Ahmed
(74) *Attorney, Agent, or Firm* — Westman, Champlin & Koehler, P.A.

(57) ABSTRACT

A method includes storing a data group in a first zone of a plurality of radial zones of a data storage disc. Each different one of the plurality of zones has a different throughput level. The method further includes obtaining information related to an access frequency of the data group stored in the first zone of the plurality of zones. Based on the information related to the access frequency of the data group and the different throughput levels of the different zones, a determination is made as to whether to migrate the data group from the first zone of the plurality of zones to a second zone of the plurality of zones.

19 Claims, 5 Drawing Sheets

(56) References Cited

U.S. PATENT DOCUMENTS

| | | | |
|---|---|---|---|
| 9,575,886 B2* | 2/2017 | Gole | G06F 3/0616 |
| 2004/0088479 A1* | 5/2004 | Hall | G06F 3/0614 |
| | | | 711/112 |
| 2011/0010514 A1 | 1/2011 | Benhase et al. | |
| 2011/0264843 A1* | 10/2011 | Haines | G06F 12/0246 |
| | | | 711/103 |
| 2012/0151176 A1* | 6/2012 | Springberg | G06F 3/0613 |
| | | | 711/173 |
| 2014/0289492 A1* | 9/2014 | Ranjith Reddy | G06F 3/0613 |
| | | | 711/170 |
| 2015/0212938 A1* | 7/2015 | Chen | G06F 12/023 |
| | | | 711/166 |
| 2017/0249969 A1* | 8/2017 | Aiello | G11B 20/1217 |

* cited by examiner

DATA STORAGE DEVICE PERFORMANCE OPTIMIZATION METHOD AND APPARATUS

BACKGROUND

Data storage devices are used to access digital data in a fast and efficient manner. At a user level, data are often structured in terms of variable length files, which can be constituted from one or more fixed-sized logical blocks or packets (such as logical blocks which are addressed using logical block addresses (LBAs)).

To store or retrieve user data with an associated data storage device, host commands are generally issued to the device using a logical block convention. The device links LBAs associated with host write commands to physical locations or blocks of media on which the data are to be stored. The device may also utilize logical to physical translation methods to locate logical blocks in an optimal physical location from which the data are to be retrieved.

When the data storage device is characterized as a disc drive, a controller may be used to execute a seek command to move a data transducer adjacent a rotating recording disc and carry out the data transfer operation with the associated physical block(s).

With continued demands for data storage devices with ever higher data storage and data transfer capabilities, there remains a continual need for improvements in a manner in which storage of data associated with logical blocks is managed within the data storage device. It is to these and other improvements that the present embodiments are generally directed.

SUMMARY

The disclosure is related to data storage management in a data storage device that includes at least one storage medium having different zones with differing performance characteristics (e.g., different throughput levels). To help optimize performance of the data storage device, more frequently used data may be moved to zones having higher throughput levels and less frequently used data may be moved to zones having lower throughput levels.

In a particular embodiment, a data group is stored in a first zone of a plurality of radial zones of a data storage disc. Each of the plurality of zones has a different throughput level. Information related to an access frequency of the data group stored in the first zone of the plurality of zones is obtained. Based on the information related to the access frequency of the data group and the different throughput levels of the different zones, a determination is made as to whether to migrate the data group from the first zone of the plurality of zones to a second zone of the plurality of zones.

This summary is not intended to describe each disclosed embodiment or every implementation of the data storage device optimization method and apparatus. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

The disclosure is related to data storage management in a data storage device that includes at least one storage medium having different zones with differing performance characteristics (e.g., different throughput levels). In some embodiments, data storage management operations include moving more frequently used data to zones having higher throughput levels and moving less frequently used data to zones having lower throughput levels. In some embodiments, the storage media include one or more discs including zones in which multiple data tracks may be written in a partially-overlapping shingled pattern, with each successive track overwriting a portion of the previous track.

Figure 1:
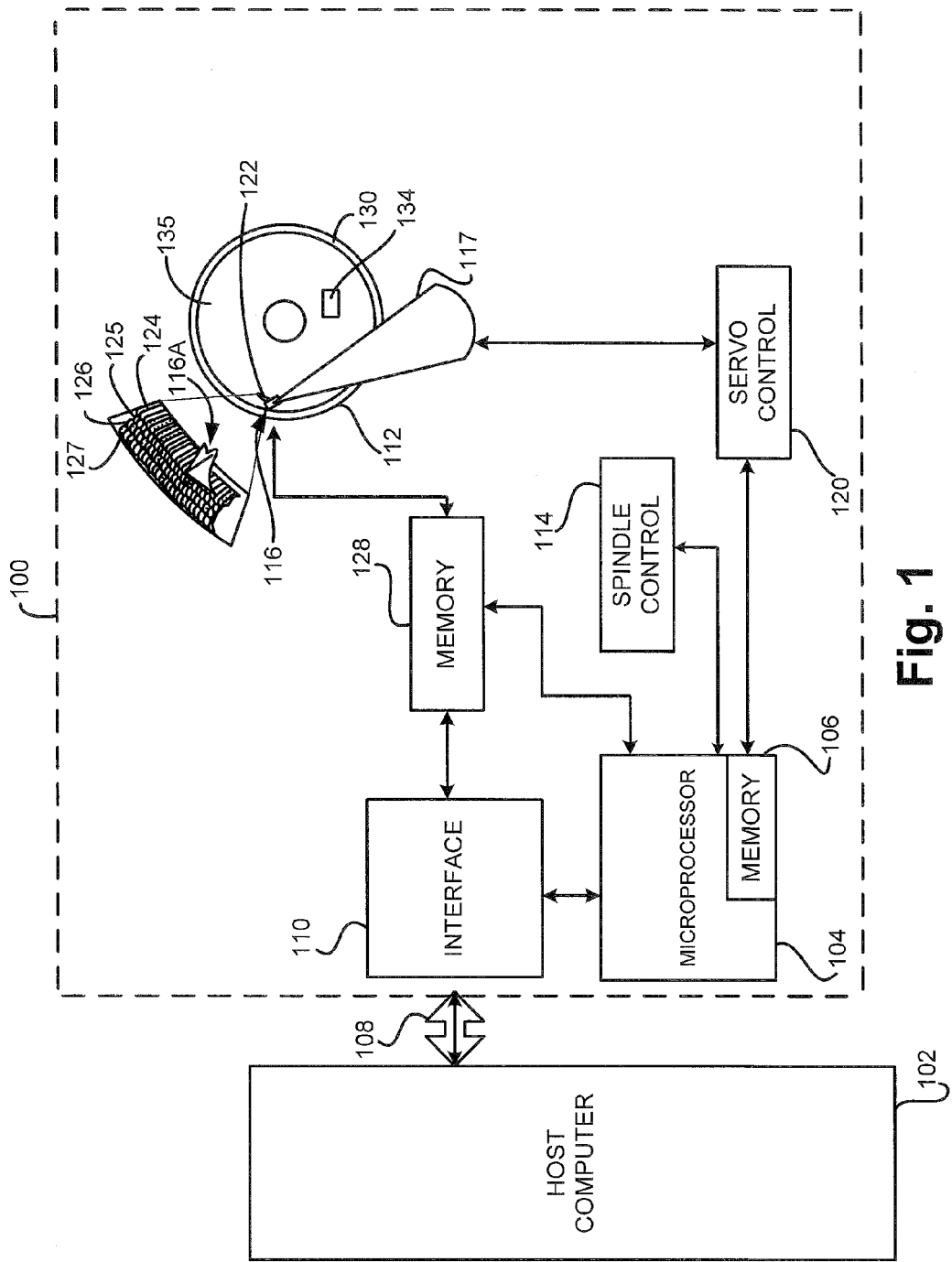
FIG. 1 is a block diagram of a disc drive in accordance with one embodiment.

FIG. 1 shows a block diagram of the disc drive 100 in accordance with one embodiment. Disc drive 100 is shown in FIG. 1 to be operably connected to a host computer 102 in which disc drive 100 may be mounted. Disc drive 100 includes a microprocessor 104 that generally provides top level communication and control for disc drive 100 in conjunction with programming for microprocessor 104 stored in microprocessor memory 106. Disc drive 100 may communicate with host computer 102 using a bus 108.

Memory 106 can include random access memory (RAM), read only memory (ROM), and other sources of resident memory for microprocessor 104. Disc drive 100 includes one or more data storage discs 112. Discs 112 are rotated at a substantially constant high speed by a spindle control circuit 114. One or more heads 116 communicate with the surface(s) of discs 112 to carry out data read/write operations. The radial position of heads 116 is controlled through the application of current to a coil in an actuator assembly 117. A servo control system 120 provides such control.

In some embodiments, tracks may be written on one or more storage discs 112 in a partially-overlaying relationship. The overlaying of tracks is shown in close-up view of area 122 of disc(s) 112. In area 122, a corner of head 116A is shown writing a track portion 124. Different shading within the track portion 124 represents different magnetic orientations that correspond to different values of stored binary data. The track portion 124 is overlaid over part of track portion 125. Similarly, track portion 125 is overlaid over part of portion 126, portion 126 is overlaid over portion 127, etc.

The portions 124-127 may be part of a physical band which, in this embodiment, may include tens, hundreds or thousands of similarly overlapping, concentric portions 124-127. Gaps are created between such physical bands so that each physical band can be updated independently of other physical bands. The overlaying of successive track portions within a physical band in shingled magnetic recording (SMR) means that individual parts of the physical band may not be randomly updated on their own. This is because spacings between centers of track portions 124, 125, 126, 127, for example, are smaller than a width of a write pole (not separately shown) of head 116. However, a width of a reader (not separately shown) of head 116 may be small enough to read individual track portions 124, 125, 126, 127, thereby enabling random reads of data to be carried out.

In certain embodiments, disc drive 100 includes a memory 128 that may serve as, for example, a first/upper level cache or buffer. In some embodiments, memory 128 is physically separate from discs 112. The memory 128 may be of a different type than the discs 112. For example, in certain embodiments, memory 128 may be constructed from solid-state components. In one embodiment, memory 128 may be a dynamic random-access memory. In another embodiment, memory 128 may be a Flash memory.

In some embodiments, the one or more storage discs 112 are managed as multiple disc portions (e.g., portions 130 and portion 135). In some embodiments, disc portion 130 is used for a second level cache (e.g., a portion of the disc(s) 112 may be reserved for use as second level cache). In some embodiments, disc portion 130 may comprise shingled bands. In other embodiments, disc portion 130 may be non-shingled (e.g., element 130 may include tracks that are each of a sufficiently large width relative to the width of the write pole of head 116 to allow the write pole to write data to individual ones of the tracks without overwriting data in any adjacent tracks).

Disc drive 100 may use memory 128 in conjunction with disc portion 130 in order to manage data as the data is being transferred to main storage locations 135 on disc(s) 112. In the interest of simplification, components such as a read/write channel which encodes data and provides requisite write current signals to heads 116 is not shown in FIG. 1.

Figure 2:
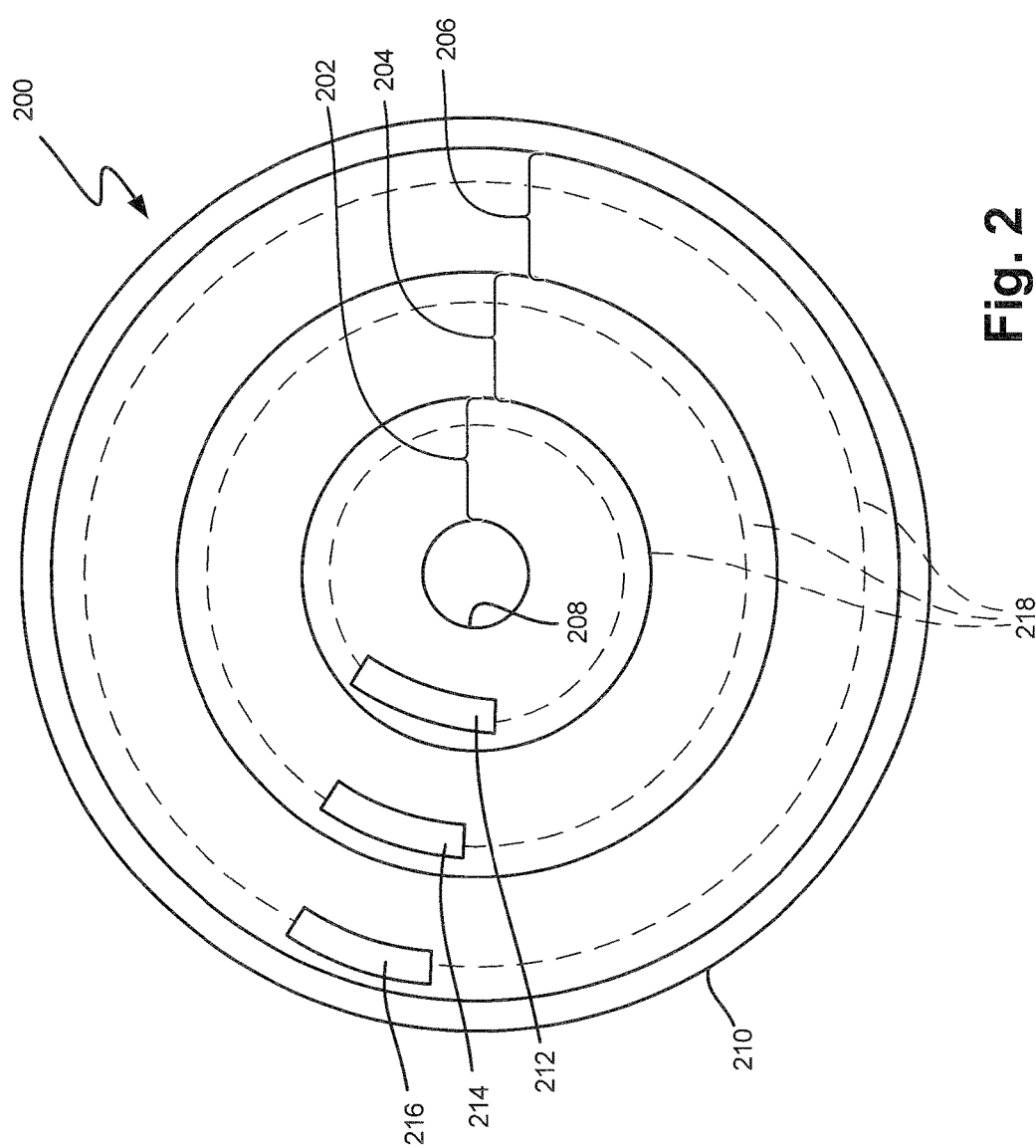
FIG. 2 is a diagrammatic illustration of a data storage disc having a surface that is segmented into different radial zones with differing performance characteristics.

FIG. 2 is a diagrammatic illustration of a data storage disc 200 having a surface that is segmented into different radial zones with differing performance characteristics (e.g., different throughput levels) in accordance with one embodiment. Disc 200 is illustratively a data storage disc such as disc 112 in FIG. 1. In the interest of simplification, only three different zones (202, 204 and 206) are included in data storage disc 200. However, in different embodiments, any suitable number of zones may be employed.

Zones 202, 204 and 206 are between an inner diameter (ID) 208 and an outer diameter (OD) 210 of disc 200. Zone 202, which is closer to the ID 208 than zones 204 and 206, has a lowest throughput level of the three zones 202, 204 and 206. Zone 206, which is closer to the OD 210 than zones 202 and 204, has a highest throughput level of the three zones 202, 204 and 206. Zone 204 has an intermediate throughput level between the throughput levels of the zone 202 and zone 206.

A first data group (e.g., a first group of data packets with each data packet addressed by a different host logical block address (LBA)) 212 is stored in zone 202. A second data group (e.g., a second group of data packets with each data packet addressed by a different host LBA) 214 is stored on zone 204, and a third data group (e.g., a third group of data packets with each data packet addressed by a different host LBA) 216 is stored in zone 206. It should be noted that data groups 212, 214 and 216 may be stored within zones 202, 204 and 206, respectively, on tracks 218 that are either SMR tracks or non-shingled tracks. It should also be noted that a suitable memory (e.g., memory 106 of FIG. 1) may include information that maps locations of data groups 212, 214 and 216 within zones 202, 204 and 206, respectively. The mapping information may include a table that links LBAs of data groups 212, 214 and 216 with physical block addresses (PBAs) of respective physical storage locations within zones 202, 204 and 206.

A controller/processor (e.g., microprocessor 104 of FIG. 1) may monitor usage (e.g., read and/or write access by a host such as 102 of FIG. 1) of data groups 212, 214 and 216 to determine if any of the data groups 212, 214 and 216 should be moved from a respective current zone 202, 204, 206 to a different one of zones 202, 204, 206. It should be noted that instructions for monitoring usage of data and for relocating data may be stored in a memory that the controller/processor is capable of accessing (e.g., memory 106 of FIG. 1).

Assume that after monitoring the usage of data group 212 within zone 202, the controller/processor (e.g., microprocessor 104 of FIG. 1) determines that data group 212 within zone 202 should be moved to a zone having a higher throughput level as the data group 212 has become highly active. Also, assume that after monitoring the usage of data group 216 within zone 206, the controller/processor (e.g., microprocessor 104 of FIG. 1) determines that data group 216 within zone 206 should be moved to a zone having a lower throughput level as the data group 216 has become inactive.

Accordingly, the controller/processor (e.g., microprocessor 104 of FIG. 1) may relocate the data group 212 to zone 206 and relocate the data group 216 to zone 202. In some embodiments, the relocation may involve copying the data group 212 from zone 202 to free physical storage locations in zone 206, and copying the data group 216 from zone 206 to free physical storage locations in zone 202. As part of the copying operations, mapping information is updated to reflect the relocation of the data groups 212 and 216. In some embodiments, updating the mapping information may include unmapping prior LBA-PBA associations (e.g., removing LBA-PBA associations linking data group 212 and zone 202 and removing LBA-PBA associations linking data group 216 and zone 204), and making new LBA-PBA associations (e.g., adding LBA-PBA associations linking data group 212 and zone 206 and adding LBA-PBA associations linking data group 216 and zone 202). It should be noted that, once unmapping is carried out, data in the unmapped locations may be overwritten.

In some embodiments, the new LBA-PBA associations may be made without unmapping at least some of the prior LBA-PBA associations. For example, when data group 212 is copied to zone 206, the new LBA-PBA associations linking data group 212 and zone 206 are made and no unmapping of the prior LBA-PBA associations are carried out (e.g., LBA-PBA associations linking data group 212 and zone 202 are not removed). This results in two copies of data group 212 being present on data storage medium 200 (one in zone 206 and the other in zone 202).

It should be noted that if free space is unavailable or very limited in zones 202 and/or 206, a data swap operation may be carried out. For example, data groups 212 and 216 may be transferred from zones 202 and 206, respectively, into a cache memory (e.g., memory 128 of FIG. 1). Data group 212 may then be written to at least some physical storage locations in zone 206 that were previously occupied by data group 216, and data group 216 may be written to at least some physical storage locations in zone 202 that were previously occupied by data 212. Of course, mapping information is suitably updated.

As indicated above, usage of a data group 212, 214, 216 is monitored or tracked. In one embodiment, usage of the data group 212, 214, 216 is tracked by treating a group of LBAs (e.g., an LBA range) associated with that data group 212, 214, 216 as a temperature unit, where a temperature level or value of a particular temperature unit is indicative a frequency at which the data group 212, 214, 216 associated with that temperature unit is accessed. In some embodiments, the temperature value of the LBA range is incremented when a read/write operation is carried out on at least one data block associated with at least one LBA in the LBA range. In such embodiments, the temperature value is decremented when no read/write operation is carried out on at least one data block associated with at least one LBA in the LBA range in a predetermined time interval. In the example of FIG. 2, "cold" data may be stored in zone 202, data having a "medium" temperature may be stored in zone 204, and "hot" data may be stored in zone 206. Data may be migrated from one zone to another based on a comparison between a temperature value of LBAs associated with the data group and a threshold temperature value. In some embodiments, the threshold temperature value may be dynamically determined based on a difference between temperature values of LBAs associated with data in one zone and temperature values of LBAs associated with data in another zone. As specific example of how temperature units are managed is described below in connection with FIG. 3.

Figure 3:
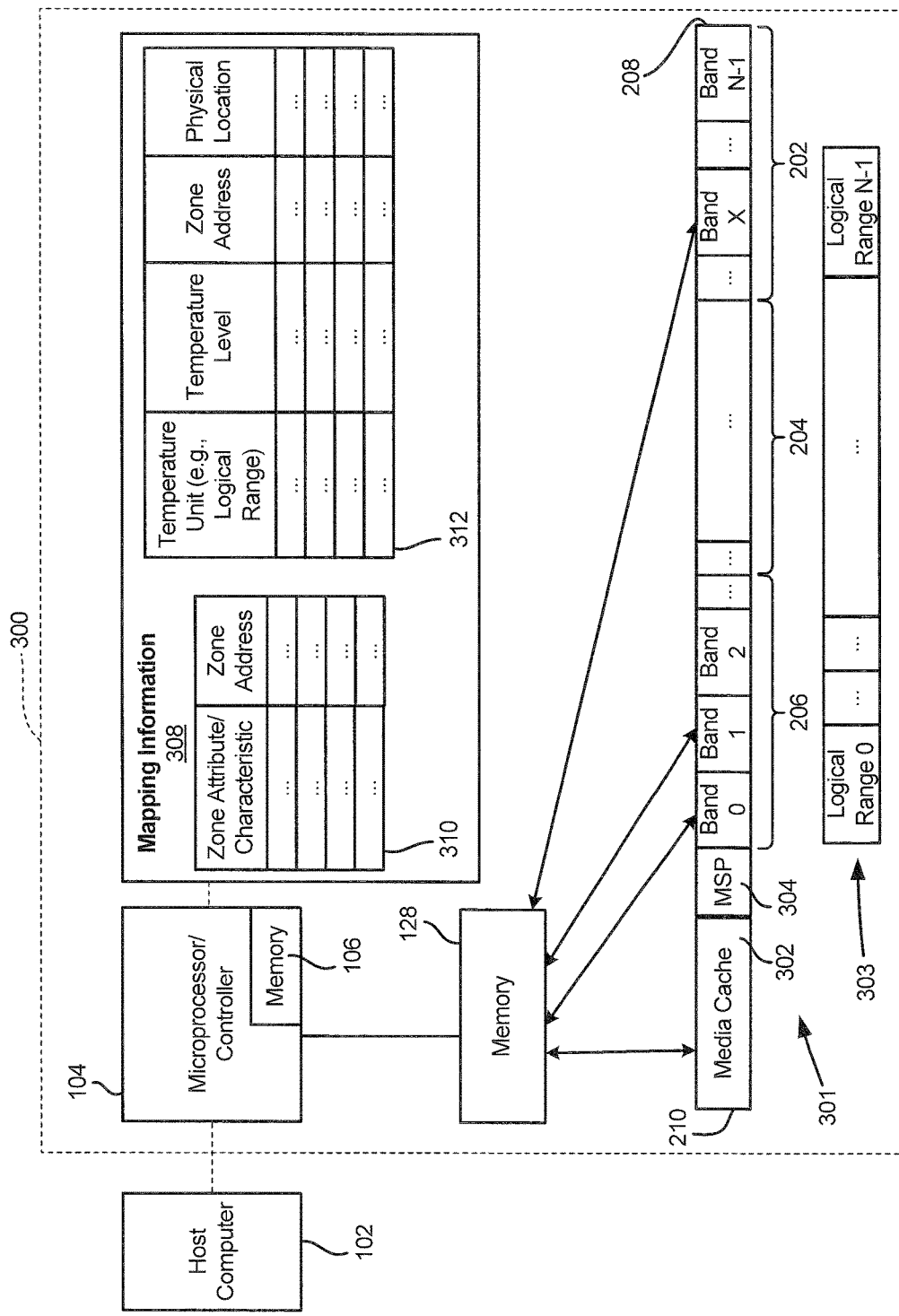
FIG. 3 is a simplified block diagram of a disc drive in accordance with another embodiment.

FIG. 3 is a simplified block diagram showing a data storage device 300 in accordance with another embodiment. Data storage device 300 includes several elements that are similar to those shown in data storage device 100 (of FIG. 1) and disc 200 (of FIG. 2). The same reference numerals are used for the substantially similar elements. Further, in the interest of brevity, a description of the similar elements is not repeated.

Data storage device 300 includes a disc 301 that is illustrated schematically in FIG. 3 as a disc portion between ID 208 and OD 210. Disc 301 includes a media cache 302, a media scratchpad 304 and a main storage area or main store 306. The media cache 302 and media scratchpad 304 areas may together form an outer disc portion such as 130 (of FIG. 1). Further, main storage area 306 may correspond to disc area 135 (of FIG. 1). Main store 306 includes a plurality of physical SMR bands 308 (e.g., N physical bands (Band 0-Band N−1)). In the interest of simplification, it is assumed that the entire set of physical bands 308 (e.g., Band 0-Band N−1) constitutes the entire storage space supplied by data storage device 300 that includes disc 301. Also, it is assumed that the whole host LBA space is equally divided amongst a plurality of LBA ranges 303 (e.g., N LBA ranges (LBA range 0-LBA range N−1)). Further, it is assumed that each of the plurality of physical SMR bands 308 has a size that corresponds to a total size of data packets associated with each of the plurality of LBA ranges 303. Additionally, each LBA range 303 is assumed to include 20 LBAs. For example, LBA range 0 may include LBAs 0-19, LBA range 1 may include LBAs 20-39, etc.

In the embodiment of FIG. 3, the plurality of physical SMR bands 308 is divided into three portions. A first of the three portions in included in zone 202, which is closest to the ID 208. A second portion of the plurality of physical SMR bands 308 is included in zone 204, and a third portion of the plurality of physical SMR bands 308 is included in zone 206, which is nearest to the OD 210. It should be noted that any suitable number of zones may be employed in different embodiments.

Write data form host 102, which comprises data packets associated with LBAs, are written by microprocessor/controller 104 into buffer or first level cache memory 128 substantially in an order of arrival of host write commands in the storage device 300. For example, if a first host command including data for LBAs 11-15 is received at a first point in time, that data is substantially immediately stored in buffer 128. A second host write command, received after the first host write command, including data for LBA 23-25 is stored next in buffer 128. This may be followed by, for example, storing data for LBAs 5-10 from a third host write command into buffer 128.

Data from first level cache memory or buffer 128 may then be transferred in LBA order to media cache 302. Thus, data for LBAs 5-10 is transferred first into media cache 302. Data for LBAs 11-15 is transferred second into media cache 302, and data for LBAs 23-25 is transferred third into media cache 302. As indicated above, LBAs 0-19 are a part of LBA range 0 and therefore data for both LBAs 5-10 and LBAs 11-15 may include updates to data in a same band (e.g., Band 0). Since Band 0 may include valid data for LBAs 0-4 and 16-19, that valid data has to be "stitched" with updated data for LBAs 5-10 and LBAs 11-15. A process that involves updating portions of a band or "cleaning" portions of the band is referred to herein as a band rewrite operation (BRO).

A decision to select a particular LBA range and band for cleaning may be made based on one or more different criteria. For example, a physical band in the particular LBA range having a substantially small amount of valid data may result in that physical band being selected for cleaning. In general, any suitable cleaning criteria may be employed based on the application(s) for which the storage device may be used.

A BRO that carries out a band cleaning operation may include the following steps:

1) Reading data belonging to the LBA range (e.g., LBA range 0) corresponding to the band to be cleaned (e.g., Band 0) from media cache (e.g., reading data for both LBAs 5-10 and LBAs 11-15 from media cache 302);

2) Reading the band to be cleaned from main store (e.g., reading Band 0 from main store 306);

3) Stitching together the data read from the media cache (e.g., data for both LBAs 5-10 and LBAs 11-15) and the valid data in the band to be cleaned (e.g., data for LBAs 0-4 and 16-19 from Band 0) in a buffer (e.g., in memory 128);

4) Writing a copy of the stitched data into a media scratchpad (e.g., media scratchpad 304); and 5) Writing the stitched data to a suitable band in the main store.

In according with some embodiments, before carrying out, for example, step 5 of the BRO, an access frequency of data associated with the LBA range (e.g., LBA range 0) is determined. This may be carried out by reading mapping information 308 from one or more tables. In the embodiment of FIG. 3, two tables are shown as an example. A zone mapping table 310 maps zone attributes/characteristics (e.g., zone throughput levels) as a function of zone physical addresses. A temperature unit mapping table 312 includes a temperature unit (e.g., LBA range) column, a temperature level column, a zone address column and a physical location column. Thus, each row of temperature unit mapping table 312 may include an LBA range identifier, a temperature level associated with the LBA range, a zone in which data associated with the LBA range is stored and a physical location identifier (e.g., a physical band identifier) within the zone.

Based on the temperature level associated with the LBA range (e.g., LBA range 0), a suitable zone is selected for storing the stitched data. For example, if data associated with LBA range 0 is found to have a low temperature in temperature unit mapping table 312, step 5 of the BRO may store the stitched data in Band X, which is in zone 202. Temperature unit mapping table 312 may then be updated to indicate that LBA range 0 is now associated with Band X. By combining the BRO and the movement of data amongst zones based on temperature level (e.g., data access frequency) a need for separate write operations for the BRO and zone transfers is avoided. This provides improved drive performance without an increase in write operations.

It should be noted that a temperature unit (e.g., an LBA range) may be smaller than a band size. For example, a 128 MB band could have four 32 MB temperature units. It should also be noted that, in some embodiments, a temperature level may be coupled with only LBA ranges or groups and not coupled with physical bands. Further, in some embodiments, temperature of the LBA range or group may be increased only by host access. In some embodiments, drive internal operations that may involve data access may not result in temperature level changes for an LBA range or group. In the example provide above, data that occupied Band 0 within the drive is moved to Band X within the drive due to an in-drive BRO. Such an operation may not result in an increase in the temperature level of the LBA range (e.g., LBA range 0) associated with the moved data.

It should be noted that the BRO is only one example of an operation in which a portion of data for an LBA range needs to be updated. Such operations are generally termed read-modify-write operations. An example of a read-modify-write operation that may need to be carried out for data stored in non-shingled tracks is described below in connection with FIG. 1.

Referring back to FIG. 1, in some embodiments, data sent from a host 102 to a device 100 may be in a form of packets that are sized smaller than a data region of a data storage location (e.g., a sector 134) on a disc 112. For instance, the packets may be 512 bytes in length, whereas the data region of the data storage location (e.g., sector 134) may be 1024 bytes in length, 1536 bytes in length, 2048 bytes in length, etc. Packets received from a host that are of a different size (smaller or larger) than an allocated storage capacity of data storage regions are referred to as unaligned packets. In such embodiments, certain processing needs to be carried out to properly accommodate the unaligned packets into the storage locations (e.g., sectors 134). The processing can include first reading whatever data is currently stored in the storage locations, for the unaligned packets, into cache, modifying the current data with the data in the unaligned packets, and then writing the modified data to the storage location. As noted above, such a read-modify-write operation may need to be carried out even when non-shingled tracks are used. In some embodiments, data may me moved from data storage locations in one zone to data storage locations in another zone in conjunction with a read-modify-write operation in a manner described above in connection with the BRO. Read-modify-write operations may also be useful in disc drives that employ interlaced magnetic recording (IMR). An IMR example is described below in connection with FIG. 4.

Figure 4:
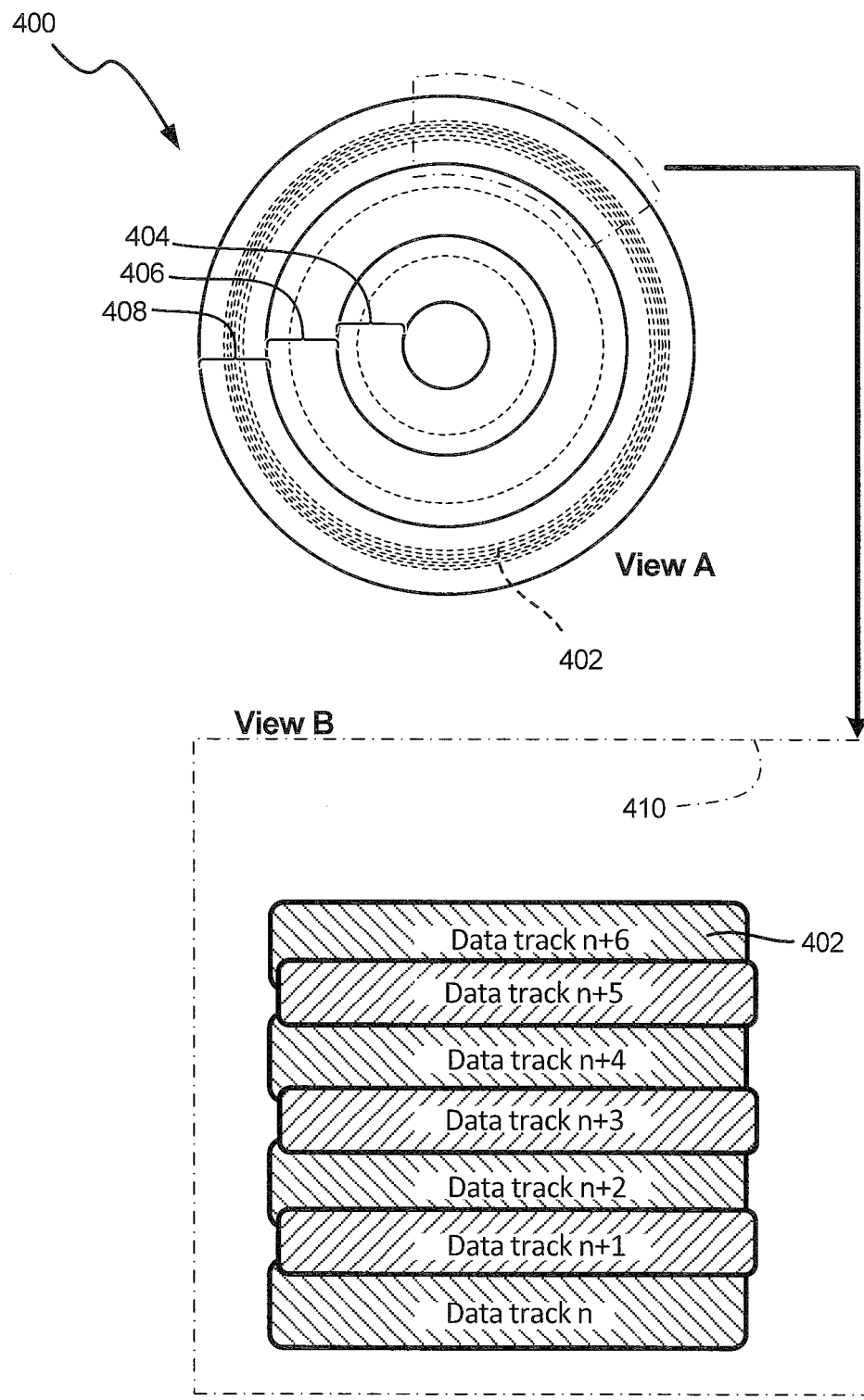
FIG. 4 is a diagrammatic illustration of a surface of a disc that includes interlaced magnetic recording tracks.

FIG. 4 is a diagrammatic illustration of a surface of a disc 400 that includes IMR tracks. As illustrated in View A of FIG. 4, the surface of disc 400 includes tracks 402. Also, the surface of disc 400 includes a plurality of zones such as 404, 406 and 408.

View B of FIG. 4 illustrates a magnified view 410 of a portion of tracks 402. IMR utilizes alternating data tracks of different written track widths arranged with slightly overlapping written track boundaries. For example, the IMR technique shown in the magnified view 410 illustrates alternating data tracks of two different written track widths. A first series of alternating tracks (e.g., the tracks n, n+2, n+4 and n+6) have a wider written track width than a second series of interlaced data tracks (e.g., n+1, n+3 and n+5) that have a narrower track width.

In the magnified view 410, each wide data track of the first series is written before the narrow and directly adjacent data tracks of the second series. For example, the data track n+2 is written before data is written to either of the data tracks n+1 and n+3. Data writes to the data tracks n+1 and n+3 overwrite outer edge portions of the data track n+2; however, the data track n+2 is still readable due to sufficient information retained in a center region of the data track n+2. Because each data track of wide written track width is written prior to directly adjacent data tracks of narrower written track width, the data tracks of the wider written track width (e.g., data tracks n, n+2, n+4 and n+6) are also referred to herein as "bottom tracks," while the alternating data tracks of narrower written width (e.g., the data tracks n+1, n+3 and n+5) are referred to herein as "top tracks."

In the example shown in FIG. 4, if data in a bottom track (e.g., data track n+2) is to be updated, a read-modify-write operation has to be carried out because directly writing to data track n+2 would result in adjacent top tracks n+1 and n+3 being overwritten. Thus, before the update to data track n+2 is carried out, data tracks n+1 and n+3 are read. An update to data track n+2 is then carried out. In accordance with one embodiment, instead of next writing the read data back to tracks n+1 and n+3, an intervening step of determining access frequencies (e.g. temperature levels) of data from tracks n+1 and n+3 is carried out. Based on the access frequencies, a determination is made as to whether to relocate the data to tracks in a different zone or to write the data back to tracks n+1 and n+3.

Figure 5:
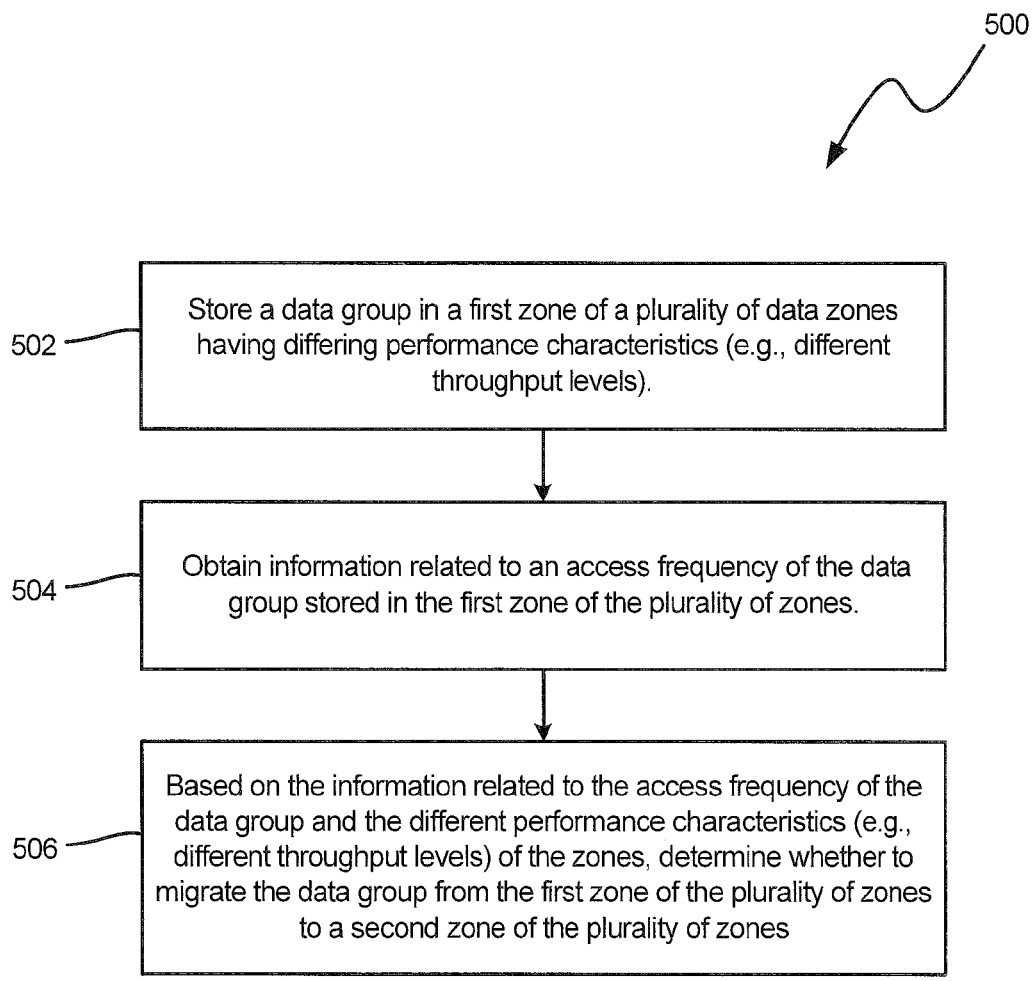
FIG. 5 is a flow diagram of a method embodiment.

FIG. 5 is a simplified flow diagram 500 of a method embodiment. The method includes, at step 502, storing a data group in a first zone of a plurality of radial zones of a data storage disc. Each different one of the plurality of zones has a different throughput level. The method further includes, at step 504, obtaining information related to an access frequency of the data group stored in the first zone of the plurality of zones. In some embodiments, this information may include relative accesses information of the data group (e.g., information as to whether the data group was last accessed before/after other data groups in the first zone were last accessed). At step 506, based on the information related to the access frequency of the data group and the different throughput levels of the different zones, a determination is made as to whether to migrate the data group from the first zone of the plurality of zones to a second zone of the plurality of zones.

In accordance with various embodiments, the methods described herein may be implemented as one or more software programs running on one or more computer processors or controllers, such as those included in devices 100 and 300. Dedicated hardware implementations including, but not limited to, application specific integrated circuits, programmable logic arrays and other hardware devices can likewise be constructed to implement the methods described herein. In should be noted that the data storage device performance optimization techniques described above are implemented entirely in the data storage device and are transparent to the host.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A data storage device comprising:
   at least one storage disc having a recording surface segmented into a plurality of radial zones, wherein each different one of the plurality of radial zones has a different throughput level; and
   a controller configured to:
   obtain information related to an access frequency of a data group stored in a first one of the plurality of radial zones;
   based on the information related to the access frequency of the data group and the different throughput levels of the different radial zones, determine whether to migrate the data group from the first one of the plurality of radial zones to a second one of the plurality of radial zones; and
   when a determination to migrate the data group to the second one of the plurality of radial zones is made, then, when a subsequent drive internal operation on a portion of the data in the data group that is to be migrated from the first one of the plurality of radial zones is performed, directly store the data group as modified by the drive internal operation in the second one of the plurality of radial zones, thereby eliminating any writing of the modified data group to the first one of the plurality of radial zones before the storage in the second one of the plurality of radial zones.

2. The data storage device of claim 1 and wherein each of the plurality of radial zones comprises at least one shingled magnetic recording (SMR) band that includes SMR tracks, and wherein the drive internal operation is a SMR band rewrite operation.

3. The data storage device of claim 1 and wherein each of the plurality of radial zones comprises non-shingled tracks, and wherein the drive internal operation is carried out on unaligned data blocks received in the data storage device.

4. The data storage device of claim 1 and wherein the information related to the access frequency of the data group comprises a temperature value associated with a logical block address (LBA) range that includes LBAs of data blocks of the data group.

5. The data storage device of claim 4 and wherein the controller is configured to determine whether to migrate the data group from the first one of the plurality of radial zones to a second one of the plurality of radial zones based on a comparison between the temperature value associated with the LBA range and a threshold temperature value.

6. The data storage device of claim 5 and wherein the temperature value of the LBA range is a variable temperature value that is incremented when a read/write operation is carried out on at least one data block associated with at least one LBA in the LBA range.

7. The data storage device of claim 1 and wherein the temperature value of the LBA range is a variable temperature value that is decremented when no read/write operation is carried out on at least one data block associated with at least one LBA in the LBA range in a predetermined time interval.

8. The data storage device of claim 1 and wherein an innermost radial zone of the plurality of radial zones that is nearest to an inner diameter of the at least one storage disc has a lowest throughput level, and wherein an outermost radial zone of the plurality of radial zones that is nearest to an outer diameter of the at least one storage disc has a highest throughput level.

9. A method comprising:
   storing a data group in a first radial zone of a plurality of radial zones of a data storage disc, wherein each different one of the plurality of radial zones has a different throughput level, and wherein an innermost zone of the plurality of radial zones that is nearest to an inner diameter of the at least one storage disc has a lowest throughput level, and wherein an outermost radial zone of the plurality of radial zones that is nearest to an outer diameter of the at least one storage disc has a highest throughput level;
   obtaining information related to an access frequency of the data group stored in the first radial zone of the plurality of radial zones;
   based on the information related to the access frequency of the data group and the different throughput levels of the different radial zones, determining whether to migrate the data group from the first radial zone of the plurality of radial zones to a second radial zone of the plurality of radial zones; and
   when a determination to migrate the data group to the second radial zone of the plurality of radial zones is made, then, when a subsequent drive internal operation on a portion of the data in the data group that is to be migrated from the first one of the plurality of radial zones is performed, directly store the data group as modified by the drive internal operation in the second one of the plurality of radial zones, thereby eliminating any writing of the modified data group to the first one of the plurality of radial zones before the storage in the second one of the plurality of radial zones.

10. The method of claim 9 and wherein the information related to the access frequency of the data group comprises a temperature value associated with a logical block address (LBA) range that includes LBAs addresses of data blocks of the data group.

11. The method of claim 10 and further comprising determining whether to migrate the data group from the first one of the plurality of radial zones to a second one of the plurality of radial zones based on a comparison between the temperature value associated with the LBA range and a threshold temperature value.

12. The method of claim 11 and further comprising incrementing the temperature value of the LBA range when a read/write operation is carried out on at least one data block associated with at least one LBA in the LBA range.

13. The method of claim 11 and further comprising decrementing the temperature value of the LBA when no read/write operation is carried out on at least one data block associated with at least one LBA in the LBA range in a predetermined time interval.

14. A data storage device comprising:
    at least one storage disc having a recording surface segmented into a plurality of radial zones, wherein each different one of the plurality of radial zones has a different throughput level, and wherein each of the plurality of radial zones comprises at least one shingled magnetic recording (SMR) band that includes SMR tracks; and
    a controller configured to:
        store a data group in a SMR band in a first one of the plurality of radial zones;
        obtain information related to an access frequency of the data group stored in the SMR band in the first one of the plurality of radial zones;
        based on the information related to the access frequency of the data group and the different throughput levels of the different radial zones, determine whether to migrate the data group from the SMR band in the first one of the plurality of radial zones to a SMR band in second one of the plurality of radial zones; and
        when a determination to migrate the data group to the SMR band in the second one of the plurality of radial zones is made, wait for a band rewrite operation on the SMR band in the first one of the plurality of radial zones, and migrate the data group to the SMR physical band in the second one of the plurality of radial zones in conjunction with the band rewrite operation.

15. The data storage device of claim 14 and wherein the information related to the access frequency of the data group comprises a temperature value associated with a logical block address (LBA) range that includes LBAs addresses of data blocks of the data group.

16. The data storage device of claim 15 and wherein the controller is configured to determine whether to migrate the data group from the SMR band in the first one of the plurality of radial zones to the SMR band in a second one of the plurality of radial zones based on a comparison between the temperature value associated with the LBA range and a threshold temperature value.

17. The data storage device of claim 16 and wherein the temperature value of the LBA range is a variable temperature value that is incremented when a read/write operation is carried out on at least one data block associated with at least one LBA in the LBA range.

18. The data storage device of claim 16 and wherein the temperature value of the LBA range is a variable temperature value that is decremented when no read/write operation is carried out on at least one data block associated with at least one LBA in the LBA range in a predetermined time interval.

19. The data storage device of claim 14 and wherein an innermost radial zone of the plurality of radial zones that is nearest to an inner diameter of the at least one storage disc has a lowest throughput level, and wherein an outermost zone of the plurality of radial zones that is nearest to an outer diameter of the at least one storage disc has a highest throughput level.

* * * * *